No. 746,165. PATENTED DEC. 8, 1903.
C. A. ROBERTSON.
COFFEE POT.
APPLICATION FILED MAR. 24, 1903.
NO MODEL. 2 SHEETS—SHEET 1.
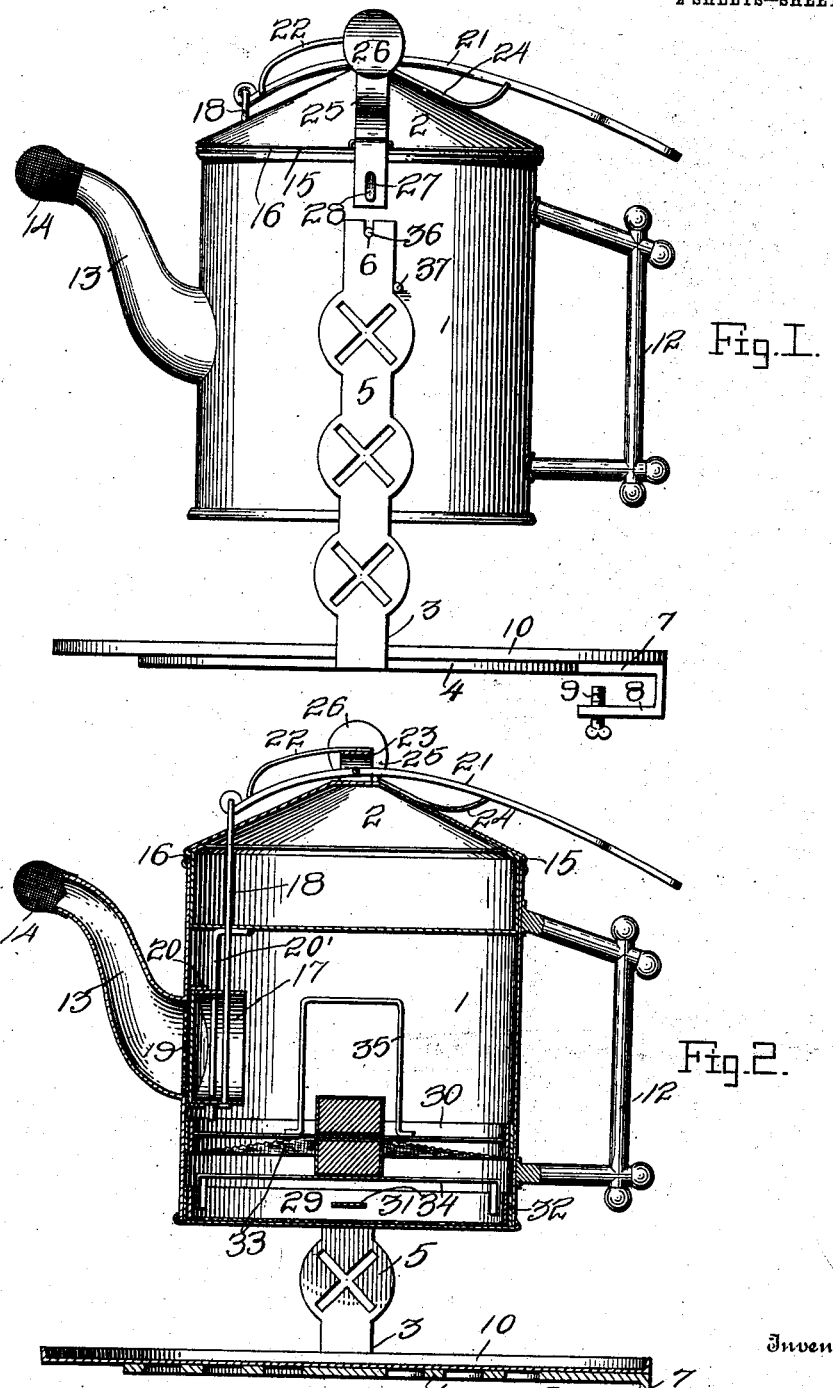
Fig. 1.
Fig. 2.
Witnesses
Inventor
C. A. Robertson
By 
Attorney No. 746,165. PATENTED DEC. 8, 1903.
C. A. ROBERTSON.
COFFEE POT.
APPLICATION FILED MAR. 24, 1903.
NO MODEL. 2 SHEETS—SHEET 2.
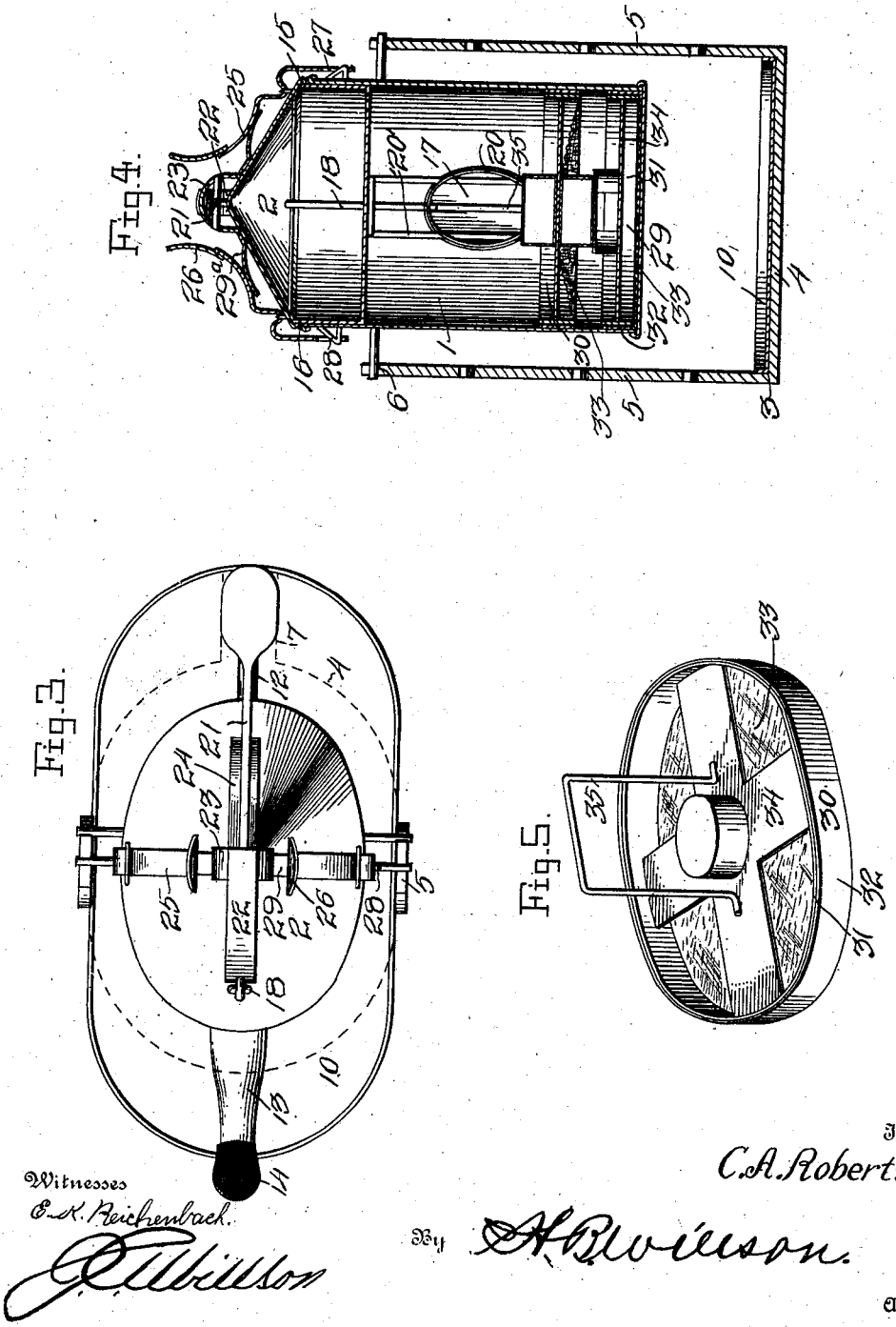
Witnesses
Inventor
C. A. Robertson.

No. 746,165. Patented December 8, 1903.

UNITED STATES PATENT OFFICE.

CULLEN A. ROBERTSON, OF SPARTA, GEORGIA.

COFFEE-POT.

SPECIFICATION forming part of Letters Patent No. 746,165, dated December 8, 1903.

Application filed March 24, 1903. Serial No. 149,379. (No model.)

*To all whom it may concern:*

Be it known that I, CULLEN ANDREW ROBERTSON, a citizen of the United States, residing at Sparta, in the county of Hancock and State of Georgia, have invented certain new and useful Improvements in Coffee-Pots; and I do declare the following to be a full, clear, and exact description of the invention, such as will enable others skilled in the art to which it appertains to make and use the same.

This invention relates to improvements in coffee-pots.

The object of the invention is to provide a coffee-pot and stand for pivotally supporting the same above the table, another object being to provide means for holding the ground coffee down on the bottom of the pot and prevent any of the grounds from getting into the spout.

A further object is to provide a coffee-pot having a hollow cover against which the steam is condensed and a valve for closing the inner end of the pouring-spout to prevent the escape of any steam.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a side elevation of a coffee-pot embodying the invention. Fig. 2 is a vertical longitudinal section of the same. Fig. 3 is a top plan view. Fig. 4 is a central vertical cross-sectional view, and Fig. 5 is a detail view of one of the weighted strainers removed from the pot.

In the drawings, 1 denotes the body of the coffee-pot, which may be of any suitable shape or design, and 2 denotes the cover of the same.

3 denotes a stand or support comprising a base-plate 4, upright standards 5, in the upper ends of which are formed bearings or seats 6. To one side of the base-plate 4 is fixed or integrally connected a rearwardly-projecting arm 7, the end of which is adapted to bend downwardly and inwardly, as at 8, the inwardly-bent end being provided with a vertically-disposed screw-threaded opening through which is adapted to be screwed a clamping-bolt 9, by which means the stand is adapted to engage the edge of table and to be clamped to the same.

10 denotes a shallow tray arranged upon the base-plate 4 beneath the pot and in position to catch any drippings from the spout of the same.

The body of the pot is provided with a suitable handle 12 and a pouring-spout 13, having at its inner end the usual perforated strainer, and on its outer end is adapted to be slipped a fine strainer 14, which is preferably globular in shape.

The cover of the pot consists of a hollow body the upper surface of which is conical in shape, and at its point of juncture with the lower part of the cover is formed an annular flange 15, which is adapted to engage the upper flaring edge of the coffee-pot. A packing ring or band 16, of suitable material, is arranged upon the cover immediately below the flange 15, whereby a steam and air tight joint is formed between the cover and the top of the pot.

17 denotes a valve fixed to the lower end of a stem 18 and adapted to normally close the inner open end of the pouring-spout 13. The valve 17 consists of a hollow elliptical-shaped body open at its rear side, the engaging face of the same being adapted to conform to the shape of the body of the pot, and over said face is adapted to be stretched a cloth or other fabric 19, which is held in place by means of a clamping-band 20, as shown. The valve 17 is adapted to slide upon guides 20', fixed to the lower side of the cover. The valve-stem 18 is adapted to pass upwardly through the cover and is formed on its upper end with an eye, to which is connected one end of an operating-lever 21, which is fulcrumed upon the top of said cover and has formed on its opposite end a thumb-piece which is arranged in a convenient position to be engaged by the thumb of the hand gripping the handle of the pot.

22 denotes a leaf-spring one end of which is fixed to a yoke 23, secured to the upper side of the cover, and the opposite end of the spring bears upon the top front end of the lever 21, while a leaf-spring 24, having one end fixed to the cover, has its opposite end bearing upon the under rear end of the lever 21, the tendency of both springs being to force the front end of the lever and valve-stem downwardly to hold the valve 17 in place over the opening of the spout into the pot.

25 denotes two levers which have a pivoted engagement with the top of the cover and are arranged one on each side of the same. The upper ends of the levers have formed thereon finger-pieces 26, while the downwardly-projecting lower ends of the levers are provided with vertically-disposed slots 27, which are adapted to engage ears or lugs 28, projecting laterally from the sides of the coffee-pot, and thereby tightly hold said cover in place. Springs 29ª are arranged beneath the upper ends of the levers to normally force the lower ends of the same into engagement with the lugs 28.

29 and 30 denote weighted strainers arranged in the coffee-pot, each consisting of inner and outer telescoping metal rings or bands 31 and 32. A straining-cloth 33 is stretched tightly across and forms a bottom for the rings, the edges of the cloth being caught and held between the two telescoping rings. Cross-braces 34 are arranged within the inner ring and are adapted to support a centrally-disposed weight which holds the strainers down. The lowermost strainer 29 is adapted to rest immediately upon the coffee-grounds and to hold the same down upon the bottom of the pot, and the strainer 30 is adapted to rest upon the strainer 29. Thus it will be seen that before any of the coffee can be poured from the spout it must necessarily pass through the two strainers 29 and 30. The upper strainer 29 is provided with a bail or handle 35 for lifting the same from the pot.

36 denotes laterally-projecting studs or trunnions fixed to the sides of the coffee-pot, which are adapted to be seated in the bearings 6, formed in the upper ends of the standards 5, whereby the pot is pivotally supported between the standards and above the drip-tray.

37 denotes stop-lugs projecting from the sides of the coffee-pot and adapted to engage the rear edge of the standards 5 below the pivotal point of the coffee-pot, whereby backward tilting of the same is prevented.

The coffee-pot and stand may be formed of any suitable metal and ornamented in any desired manner. The handle may be constructed of wood or wood and metal.

In the construction of a coffee-pot as herein described it will be seen that it would be practically impossible for any grounds to be poured from the pot and that the steam will be prevented from escaping and will condense upon the inner side of the cover. If the cloth on one of the strainers be wet in cold water and dropped into the pot of boiling coffee the same will be settled without the addition of cold water, which is usually used for this purpose.

From the foregoing description, taken in connection with the accompanying drawings, it is thought that the construction, operation, and advantages of my improved coffee-pot will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A coffee-pot having ears, and a removable cover, the latter having pivoted locking devices to engage the ears, said locking devices having finger-pieces, and springs to hold them in normal engagement with the ears, substantially as described.

2. A coffee-pot having a strainer comprising a straining fabric, outer and inner telescopically-disposed rings between which the outer portion of the straining fabric is secured, and the inner ring having cross-bars, and a weight supported on the cross-bars, substantially as described.

3. A coffee-pot having a strainer comprising a straining fabric, outer and inner telescopically-disposed rings between which the outer portion of the straining fabric is secured, and the inner ring having cross-bars, a weight supported on the cross-bars, and an upwardly-extending handle attached to one of the cross-bars, substantially as described.

In testimony whereof I have hereunto set my hand in presence of two subscribing witnesses.

CULLEN A. ROBERTSON.

Witnesses:
W. R. PRUITT,
P. A. SMITH.